United States Patent [19]

Kerkonian

[11] 4,043,552
[45] Aug. 23, 1977

[54] EXERCISER SEAT

[76] Inventor: Siragan K. Kerkonian, 6426 N. Ridge Ave., Apt. 2A, Chicago, Ill. 60626

[21] Appl. No.: 703,102

[22] Filed: July 6, 1976

Related U.S. Application Data

[63] Continuation-in-part of Ser. No. 587,213, June 13, 1975, abandoned.

[51] Int. Cl.² .............................................. A63B 21/00
[52] U.S. Cl. ............................. 272/120; 280/226 A; 297/195; 297/346
[58] Field of Search .................. 272/72, 73, 116, 120, 272/121, 38, 55; 280/226, 227, 81, 228, 65, 216, 234, 220, 281, 290, 248; 297/195, 346; 248/420; 128/25

[56] References Cited
U.S. PATENT DOCUMENTS

| | | | |
|---|---|---|---|
| 339,638 | 4/1886 | Goldie | 272/120 |
| 1,996,350 | 4/1935 | Schaff | 272/120 |
| 3,536,325 | 10/1970 | Raba | 272/116 |
| 3,727,608 | 4/1973 | Simsian | 272/73 |

*Primary Examiner*—Richard C. Pinkham
*Assistant Examiner*—T. Brown
*Attorney, Agent, or Firm*—Wegner, Stellman, McCord, Wiles & Wood

[57] ABSTRACT

An exercise seat assembly for use with a supporting frame. The assembly includes a housing attached to the frame, a seat for a rider attached to a seat support post, the seat support post being pivoted and guided in the housing so that it moves circuitously in response to the action and movement of the rider. A plurality of guiding trackways are formed within the housing and a plurality of followers are carried by the seat support post which are confined within and travel along their respective trackways so as to movably mount the seat for circuitous motion.

18 Claims, 11 Drawing Figures

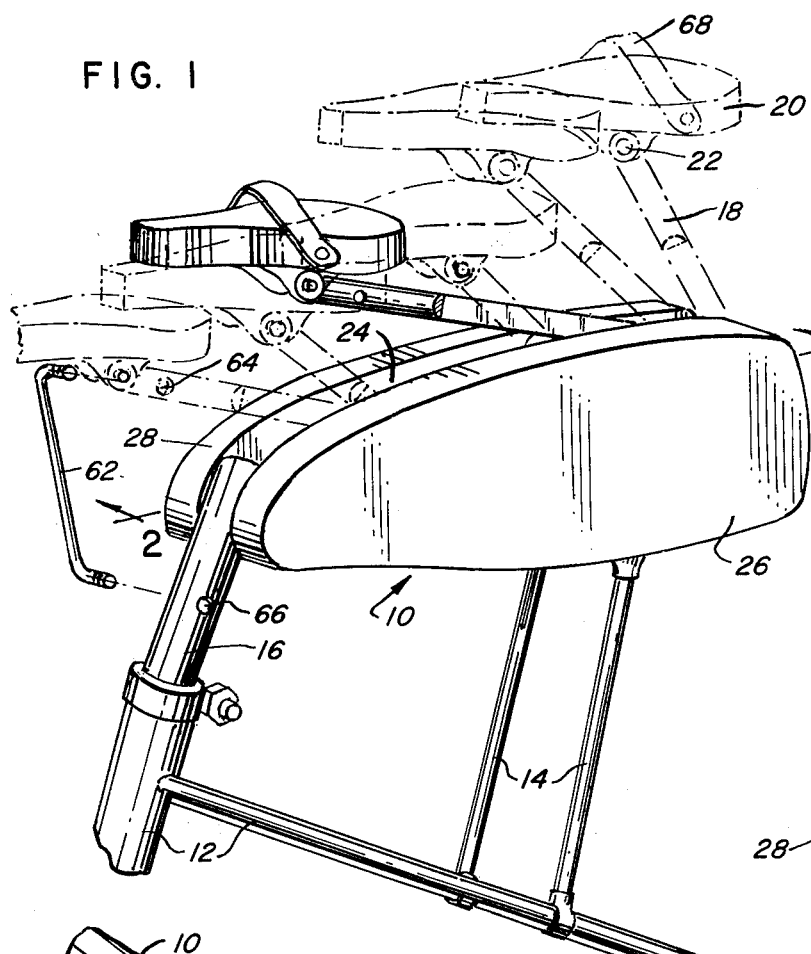
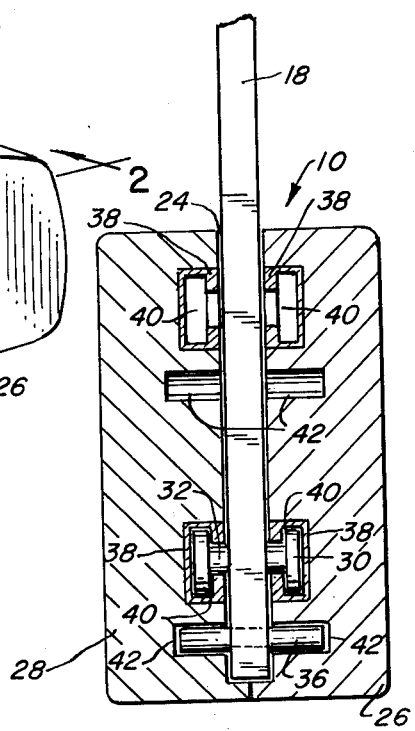
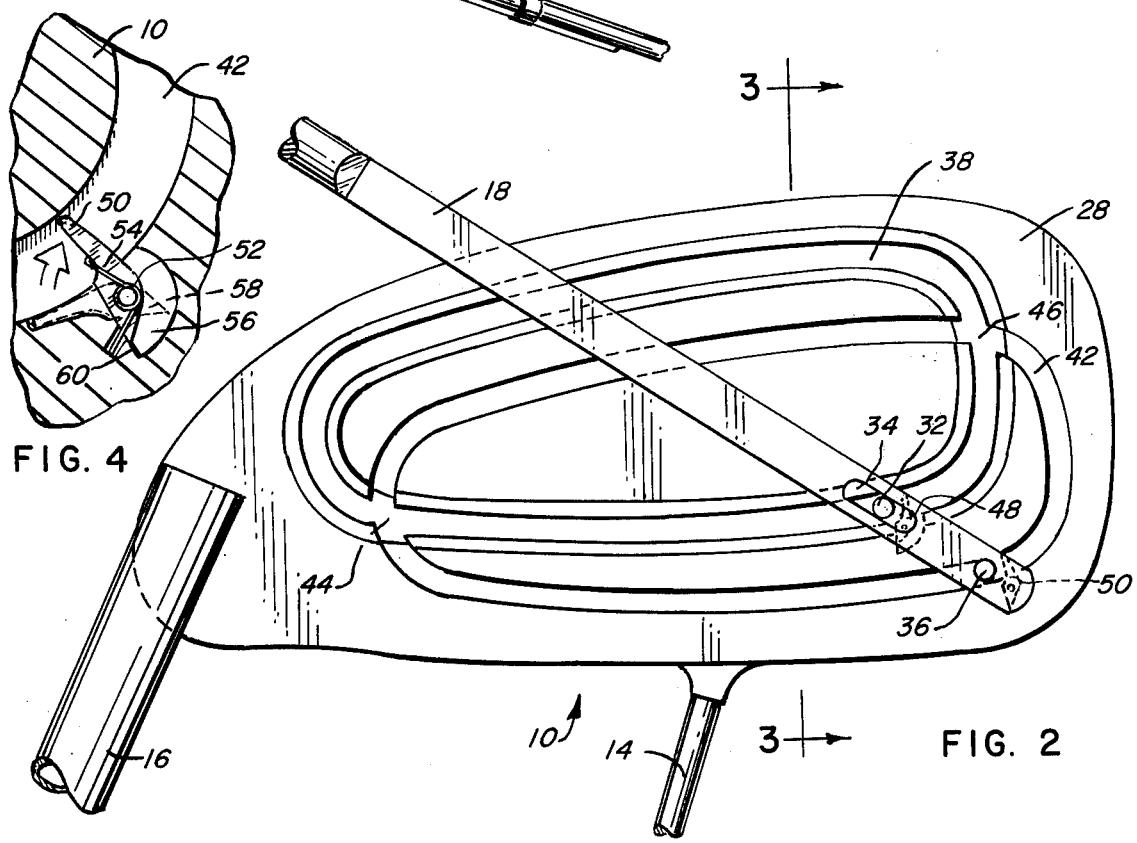
FIG. 1
FIG. 3
FIG. 4
FIG. 2

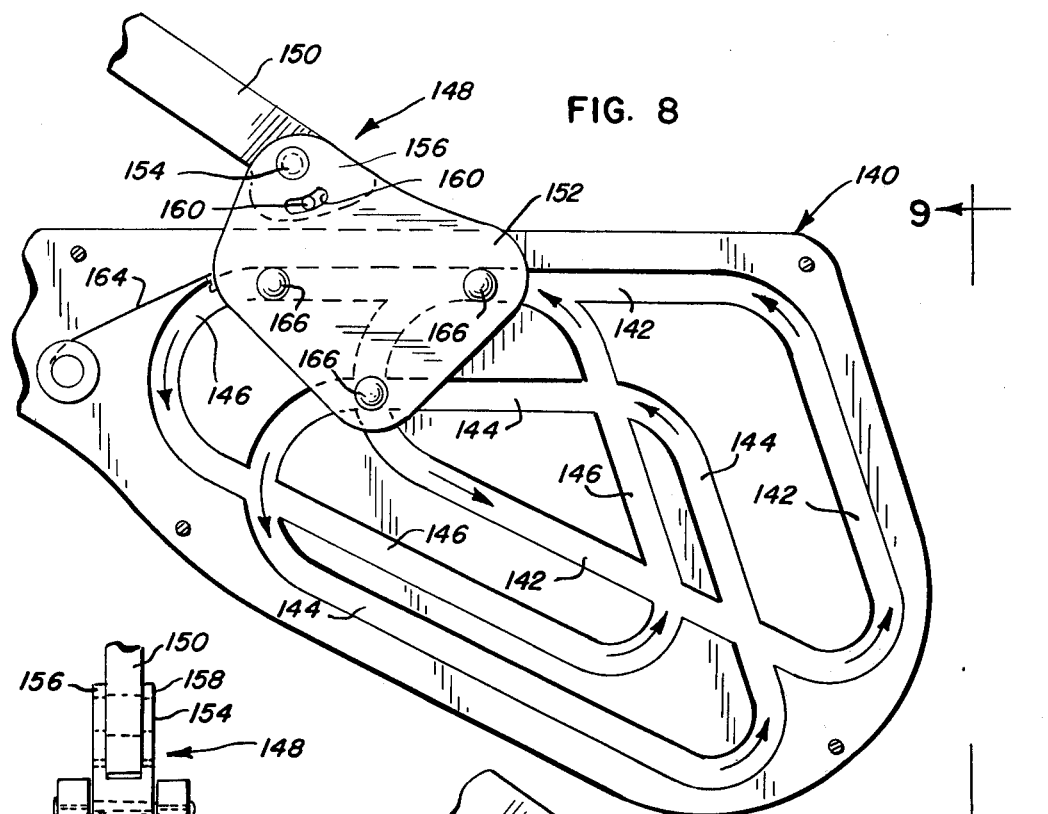
FIG. 8
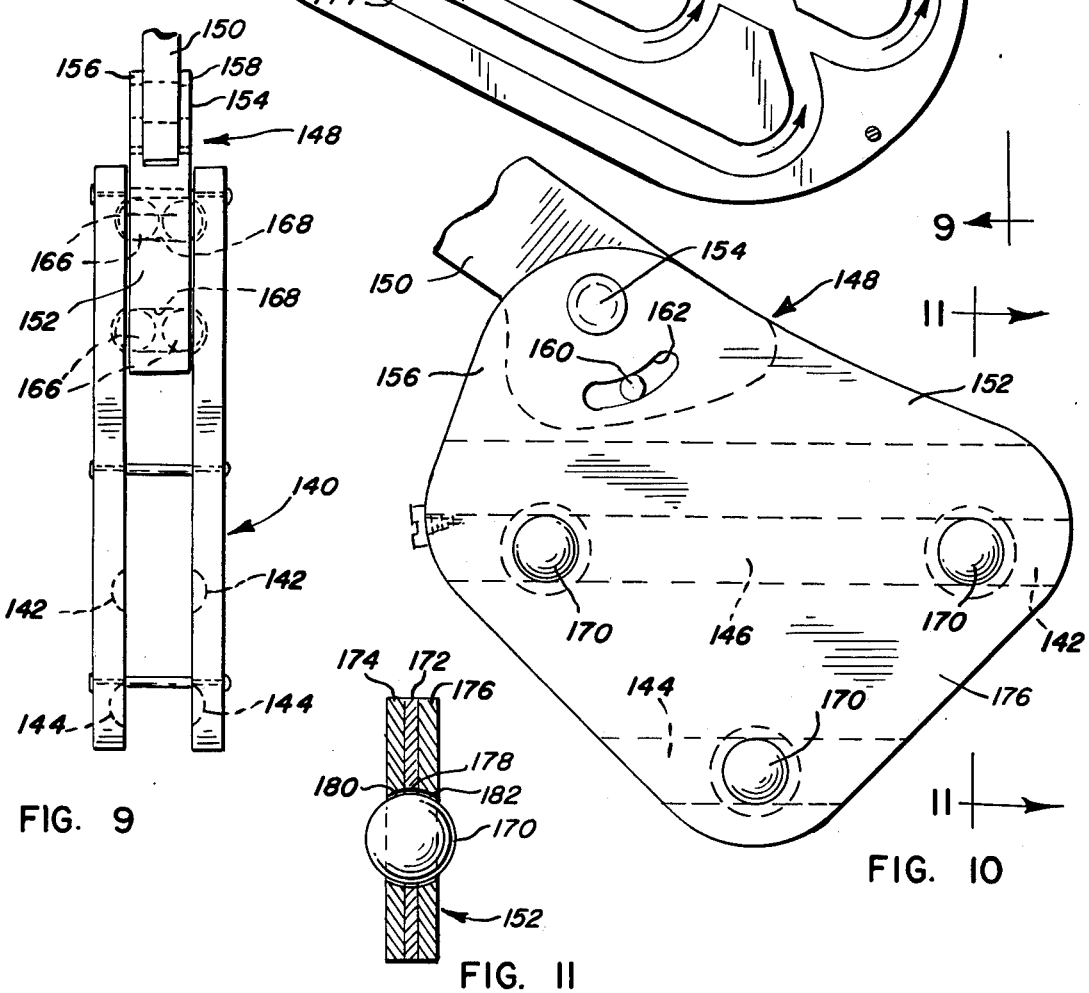
FIG. 9
FIG. 10
FIG. 11

EXERCISER SEAT

CROSS-REFERENCE TO RELATED APPLICATION

This application is a continuation-in-part of my application Ser. No. 587,213 filed June 13, 1975 (abandoned), entitled "BICYCLE EXERCISER SEAT".

BACKGROUND OF THE INVENTION

This invention relates generally to an exercising device, and more particularly to a seat assembly for mounting on an exercising device or bicycle a seat which is movable.

Exercising devices are widely known as are the more specific bicycle-like exercisers. It is also well known that these bicycle-like exercisers provide a rider with a mechanism that assists him in achieving a large amount of physical exercise.

Generally, these devices are constructed so that pedaling or similar leg action is the primary physical activity of the rider. If this were the only activity undertaken by the rider, he would only be exercising his legs and would be neglecting the exercise of the remainder of his body. In order to stimulate the rider to exercise other portions of his body, exercising devices sometimes include movable handlebars or movable seats. If the handlebars are movable and the seat is completely stationary, the rider is permitted to sit and rest his body while his arms and legs are exercising. On the other hand, including a movable seat will tend to increase the extent and variety of muscular exercise experienced by the rider. Because of the moving seat, the rider is induced to exercise his entire body while operating the device. The action of the moving seat causes alternate bending and stretching of the rider's body and tends to loosen as well as strengthen the rider's body muscles.

In most situations, however, a movable seat is mechanically aided. This mechanical assistance reduces the physical exertion of the rider, and, therefore, also reduces the benefits derived from his exercise. It is desirable from an exercise point of view to have all moving parts independent of the action or movement of other moving parts. Further, it is desirable to have the seat movable to a multiplicity of positions so that the nature and variety of exercise is increased. In pedaling of the device, pumping of the handlebars, and reciprocation of the seat are all completely disjoint and randomly diffusive, the rider is subjected to an infinite variety of bending and stretching activities that require increased exertion. In addition, he must exert the maximum amount of effort through each portion of his body to maintain all parts of the exercising device in motion since all are unaided mechanically. In such a circumstance, the rider derives the greatest amount of benefit from his exercise.

Others have proposed movable seats for bicycles or exercising devices. The movement of these seats is intended to provide additional means for powering the device, enlarging the variety of exercise, or merely simulating the action of a horse. For example, Pietsch U.S. Pat. No. 697,104 and Batchelor U.S. Pat. No. 749,153 both show bicycles driven by pumping handlebars and have seats which are mounted to slide back and forth. In Pietsch, the rider is aided in moving the handlebars by the pedals driven by his feet. The seat is freely movable horizontally in accordance with the movement of the rider. In Batchelor, the seat is moved horizontally by the action of the handlebars. Both permit the rider to place his entire body weight on the seat and thereby rest.

Toense U.S. Pat. No. 425,471, Merill U.S. Pat. No. 579,002, Bell U.S. Pat. Nos. 2,252,156 and 2,642,288, and Nelson U.S. Pat. No. 3,133,747 all show bicycles or exercising devices with vertically reciprocating seats. The movement of the seat in all of the above appears to be aided by the action of the feet on the pedals. It is also intended to some extent in these devices that the movement of the rider aid in the pedalling or propulsion of the devices. Merill also shows a strap for maintaining the seat in contact with the rider.

All of these existing methods for constructing a movable seat lack the capability of providing a seat whose movement depends solely on the action of the rider and which has a multiplicity of operative positions that fulfill the objectives of exercise. The present invention overcomes these inadequacies of the prior art.

SUMMARY OF THE INVENTION

It is a principal object of the present invention to provide a new and improved exercise seat that has a wide range of movement effectuated only by the action of the rider. More specifically, it is an object of the present invention to provide a movable exercise seat which is particularly suited for use with a conventional bicycle and which also permits normal use of the bicycle when desired.

In accordance with the present invention, a new exercise seat is provided and includes a housing attached to a frame, a seat for a rider, a seat support post for attaching the seat to the housing, and a mounting which attaches the seat support post to the housing and allows movement of the seat support post and the attached seat around an arcuate circuit.

In an exemplary embodiment of the present invention, the seat support post has a plurality of followers, each of which engage a channel defined by the side walls of the housing. The engagement of the followers with the channels movably mounts the support post. All of the channels, being somewhat elliptical, are similar, but are offset with respect to one another. The seat support post, while maintaining substantially the same orientation because of the nature of the offset, is movable around the housing by the action and movement of the rider on the seat. At all times the seat remains substantially level.

In a preferred embodiment of the present invention, the trackways overlap, thereby minimizing the size of the housing while maintaining the extent of movement achievable. The channels and followers may have differing cross-sectional configurations. This prevents the followers from traveling in the wrong channels and, therefore, enables the maintenance of the proper orientation of the support post.

In an alternative embodiment, the trackways are formed so that the lower portion of respective trackways extend rearwardly and downwardly, thereby permitting the weight of the rider to move the seat and support post rearwardly and downwardly. A constant force spring is included in the assembly to bias the seat support post for providing some assistance in moving the seat upwardly and forwardly along other portions of the trackway.

In one embodiment, there are three trackways and followers which thereby prevent the seat and support post from pivoting or tipping at critical positions during circuitous motion.

Ball-type followers may be employed to provide freer movement between the seat support post and the housing, i.e., the followers and the trackways. A single ball disposed within a suitably constructed split support post can act as a follower on both sides of the seat support post to engage corresponding trackways on each housing side wall simultaneously.

The rider is secured to the seat by a strap to aid in moving the seat. The strap is necessary to lift the seat during certain segments of its movement, since movement of the seat is not mechanically aided, but urged to move only by the action and movement of the rider.

Additional features of the present invention include a lock for immobilizing the seat and thereby providing for conventional use of a bicycle to which the seat may be attached. Also provided are stops which allow motion of the seat in only one direction around the circuitous channels; the rider is prevented from making a full circuit in a direction opposite that intended. These stops permit respites while operating the exercise device. By urging the seat toward the stopped position, the rider is able to put the seat in an equilibrium position and prevent further movement.

Further features and advantages of the present invention will readily be apparent from the following specification taken in conjunction with the accompanying drawings.

BRIEF DESCRIPTION OF THE DRAWINGS

FIG. 1 is a perspective view of the exercise seat assembly showing the circuitous motion of the seat support post and the attached seat;

FIG. 2 is a sectional view taken at line 2—2 of FIG. 1;

FIG. 3 is a partial sectional view taken at line 3—3 of FIG. 2;

FIG. 4 is an enlarged fragmentary view of FIG. 2 showing the action of the pivoted dogs.

FIG. 8 is a sectional view of another alternative embodiment of the exercise seat assembly;

FIG. 9 is a rear view of the embodiment shown in FIG. 8 taken at line 9—9 showing the use of dual balls as followers;

FIG. 10 is an enlarged side view of a support post utilizing single balls as followers; and FIG. 11 is a sectional view taken at line 11—11 of FIG. 10.

DESCRIPTION OF PREFERRED EMBODIMENTS

Figure 7:
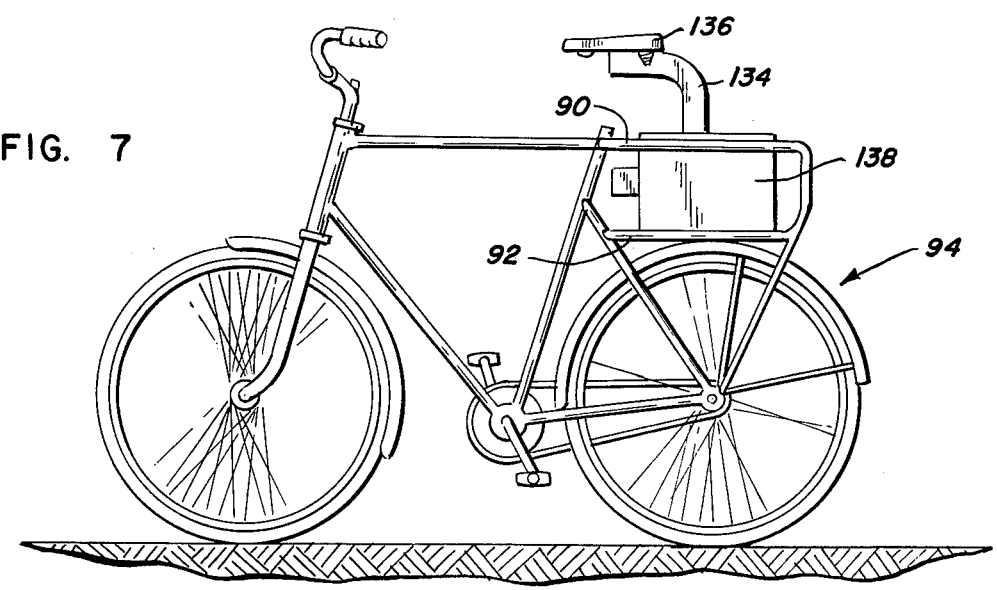
FIG. 7 is a side elevational view of a modification of the assembly of FIG. 5 attached to a bicycle.

FIGS. 1-4 show one embodiment of the exercise seat assembly of the present invention. The housing 10 of the assembly is attached to a frame 12 by the support bars 14 anchored to the frame 12 by the support neck 16 extending into and secured by a portion of the frame 12. The frame 12 may constitute in some situations the main segment of a conventional bicycle as seen in FIG. 7. A seat support post 18 is mounted to the housing 10 and carries a seat 20 which is pivotally mounted to its upper end by a bolt 22. The seat 20 is thereby adjustable to any desired orientation.

As shown in FIGS. 2 and 3, the seat support post 18 extends into the interior of the housing 10. The housing 10 has a vertically extending opening 24 defined by the side walls 26 and 28. The seat support post 18 is movable within the opening 24. The seat support post 18 has two guide members or followers which movably mount the seat support post 18 to the housing 10. One of the guide members is a roller 30 with a narrowed central portion 32. The central portion 32 is rotatably mounted in an elongate passageway 34 formed in the seat support 18. The other guide member is a support pin 36 having a smaller diameter but a greater width than the roller 30.

The roller 30 travels within the inserts 38 carried by a channel 40 forming a closed arcuate circuit. Portions of the channel 40 are defined by each of the side walls 26 and 28. The insert 38 has a cross-sectional configuration conforming to the configuration of the roller 30. The insert 38 is employed to simplify construction of the channel which otherwise would be difficult because of the enlarged interior portion lying below the surface of the side wall. The insert 38 need not be employed, however, since the channel 40 could incorporate the configuration of the insert 38. The support pin 36 travels in a rectangular channel 42 which also forms a closed arcuate circuit and has a cross-sectional configuration conforming to the configuration of the support pin 36. Portions of the channel 42 are defined by each of the side walls 26 and 28. The support pin 36 can be rotatably mounted to the seat support post 18 if desired. The channels 40 and 42 act as trackways for the followers 30 and 36. The cooperation of the channels and followers movably mounts the seat support post 18 within the housing 10 and guides the seat support post 18 around a defined circuit within housing 10. The purpose of the differing cross-sectional configuration of the followers and channels is to assure that the followers 30 and 36 will stay within their respective channels 40 and 42 when they enter and exit the channel intersections at 44 and 46. Hence, roller 30 travels exclusively within channel 40 and support pin 36 travels exclusively within channel 42. The channels need not conform exactly to the configuration of the followers, but they should be constructed so that neither of the followers can travel within the channel of the other follower.

The passageway 34 permits movement of the roller along the seat support post 18 and aids in preventing a binding action between the followers 30 and 36 and the channels 40 and 42. The channel 40 is situated generally above and forward of the channel 42. This arrangement maintains the seat support post 18 in a position which slants upwardly and forwardly. In this respect, the seat 20 remains substantially level.

In both channels 40 and 42 are pivoted dogs or seat stops 48 and 50, respectively. The operation of one of the pivoted dogs is shown with more clarity in FIG. 4. The dog 50 is pivotally mounted to pivot about a pin 52 secured to the side walls and is biased toward a braking position by a spring 54. When the seat support post 18 is moved clockwise around the housing and passes the pivoted dog 50, the pivoted dog 50 will be pushed downwardly and out of the way into the cavity 56 formed at the edge of the channel 42. After the support pin 36 on the support post has passed, the pivoted dog 50 will be urged upwardly into the channel 42 by the spring 54. If the seat support post 18 is moved counterclockwise about the housing 10, it will eventually contact the pivoted dog 50. However, continued counterclockwise movement will be prevented since the end 58 of the pivoted dog 50 opposite the channel is brought to bear against the housing 10 at 60. Pivoted dog 48 operates in a similar manner.

To render the seat 20 immovable, a C-shaped lock pin 62 is provided. As shown in FIG. 1, the ends of the lock pin 62 are inserted into the bore 64 in the seat support post 18 and the bore 66 in the support neck 16. With the lock pin 62 in place, the seat is stationary and may be used in a manner similar to a conventional bicycle seat.

Figure 5:
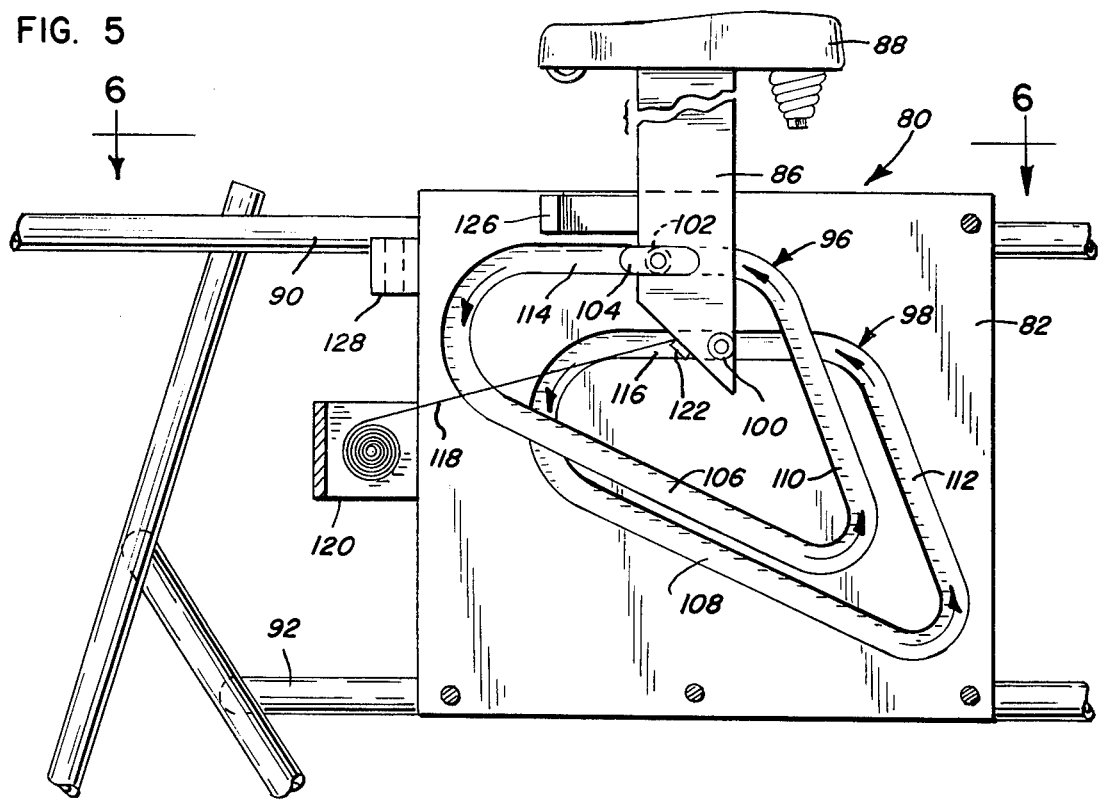
FIG. 5 is a sectional view of an alternative embodiment of the exercise seat assembly.
Figure 6:
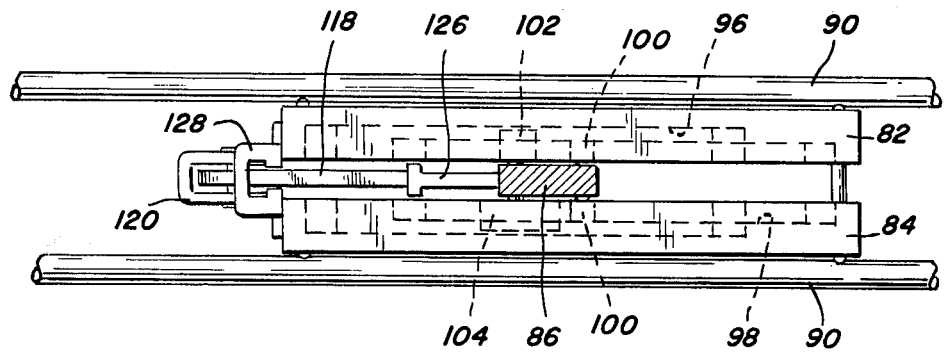
FIG. 6 is a top view of the embodiment shown in FIG. 5.

In FIGS. 5 and 6, another embodiment of the invention is shown. The exercise seat assembly includes a rectangular housing 80 having spaced-apart side walls 82 and 84, a movable upright seat support post 86 extending into the housing interior between the side walls 82 and 84, and a seat 88 attached to the post 86. The housing 80 is secured to frame members 90 and 92 which may constitute portions of a bicycle 94, as seen in FIG. 7.

Similar overlapping channels 96 and 98 are defined by each of the side walls 82 and 84. The post has outwardly extending rollers 100 confined within the channels 98, a larger roller 102 within the channel 96 in the side wall 82, and a slipper shoe 104 within the channel 96 in the side wall 84. The channel 96 has a depth greater than that of the channel 98 so as to accommodate the extended length of the larger roller 102 and the shoe 104 and prevent their movement within the wrong channels.

As best seen in FIG. 5, the channels 96 and 98 have respective bottom portions 106 and 108 extending rearwardly and downwardly, back portions 110 and 112 extending upwardly and forwardly, and top portions 114 and 116 extending forwardly. The post 86 is biased toward a forward portion of the housing 80 by a spring 118, preferably a constant force spring. A U-shaped spring housing 120 is secured to a forward portion of the housing 80 and supports the spring 118 between its legs. The spring 118 extends into the interior of the housing 80 between the side walls 82 and 84 and has a free end secured to the post 86 by a screw 122.

If the rider moves the seat 88 and post 86 in the directions indicated by the arrows in FIG. 5, the weight of the rider will cause the post 86 to move downwardly and rearwardly by gravity as the rollers 100 and 102 and the shoe 104 travel within the bottom portions 106 and 108 of the channels 96 and 98. When the post 86 reaches its lowermost and rearmost position, thereby drawing out the spring 119 to its extended position, the momentum of the post 86 and the action of the spring 118 will carry the post 86 around the curved corner so that it is moving upwardly and forwardly with substantially the same velocity that it had while it was moving downwardly and rearwardly.

When the post 86 nearly reaches a forwardmost position, it may have a tendency to pivot slightly since the center of the radius of curvature of the upper channel 96 at that point is near the channel 98. In order to prevent the post 86 from pivoting and altering its orientation when it reaches this forwardmost position, a T-bolt 126 is secured to the forward edge of the post 86 so that, upon continued motion of the post 86, the T-bolt 116 passes through a T-slot formed in bracket 128 and prevents any pivoting motion of the post 86 from its usual upright orientation.

In FIG. 7, an exercise seat assembly similar to that shown in FIGS. 5 and 6 has a seat support port 134 with a curved upper portion to place the seat 136 near its usual position when the assembly housing 138 is secured over the rear wheel of the bicycle 94.

FIGS. 8-11 show more sophisticated embodiments of the invention. In FIGS. 8 and 9, the housing 140 includes three overlapping trackways, or channels 142, 144 and 146. The seat support post, generally designated 148, includes an upper portion 150 attached to a seat (not shown) and a diamond-shaped lower portion 152 to which the upper portion 150 is pivotally secured by a pin 154 between upright walls 156 and 158 forming a part of the lower portion 152. A pin 160 carried by the upper portion 150 engages a slot 162 formed in the upright walls 156 and 158 to limit the swinging motion of the upper portion 150 and the attached seat relative to the lower portion 152. Spring 164, preferably a constant force spring, is employed to urge the seat support post 148 upwardly and forwardly relative to the housing 140.

As seen in FIG. 9, the rollers employed in the previously described embodiments have been replaced by three balls 166 which now act as the followers. The balls 166 are disposed within bores 168 extending transversely through the lower portion 152 of the seat support 148. The bores 168 and, therefore, the balls 166 are nonlinearly arranged so that when the respective channels are engaged, the post 148 is stable during movement to maintain a generally constant orientation of the seat support post 148. Each ball 166 has an outwardly extending portion which is confined to and travels within its respective channel, all of which have an arcuate cross section. Since there are three sets of appropriately positioned balls and channels, the balls remain in their respective channels despite the fact that all of the balls and channels have similar cross sections.

FIGS. 10 and 11 illustrate a slight modification to the embodiment shown in FIGS. 8 and 9. Herein, the dual balls 166 shown in FIG. 9 have been replaced by single balls 170. As best seen in FIG. 11, the lower portion 152 of the seat support post 148 has a central plate 172 and outer plates 174 and 176 disposed on either side of the central plate 172. The central plate 172 has an aperture 178 having a diameter at least as large as the diameter of the balls 170 carried therein. The outer plates 174 and 176 have apertures 180 and 182, respectively, slightly smaller than the diameter of the balls 170 so that the balls 170 are held within the lower portion 152 and extend outwardly into engagement with the arcuate trackways or channels 142, 144 and 146. The channels 142, 144 and 146 are concave grooves with a depth of about one-quarter the diameter of the balls 170. Similarly, the balls 170 are of such size relative to the width of the bottom portion 152 that approximately one-quarter of the ball extends outwardly from the sides of the lower portion 152 into the concave channels.

Because the assembly is mechanically independent of any other operational movement of the device, movement of the seat is entirely dependent on the action of the rider. While the rider can easily move the seat downwardly by placing his weight upon it, upward or lateral movement obviously cannot be accomplished in a like manner. As illustrated in FIG. 1, a seat belt or strap 68 is, therefore, provided. The seat strap 68 is anchored to the seat 20 and is placed around the rider. If the rider now rises up, moves forward or backward, the seat will follow.

I claim:

1. An exercise seat assembly for use with a supporting frame comprising:
a housing;
means for attaching said housing to said frame;
a support post having a seat for a rider attached thereto;
a plurality of guiding trackways operatively associated with said housing, each of said trackways forming a separate arcuate circuit; and
a plurality of followers operatively associated with said post, each of said followers engaging one of said trackways, each of said followers being movable relative to said housing and being limited to travel along its respective trackway, the engagement of said followers with their respective trackways movably mounting said post to said housing for circuitous movement of said post and said seat in response to pushing and pulling by said rider.

2. An exercise seat assembly for use with a supporting frame comprising:
a housing;
means for attaching said housing to said frame;
a support post having a seat for a rider attached thereto;
a plurality of followers extending from said post, said followers being spaced on said post; and
a plurality of trackways operatively associated with said housing, each of said followers being movable relative to said housing and being limited to travel along one of said trackways, each of said trackways forming a closed arcuate circuit, the engagement of said followers with their respective trackways movably mounting said post to said housing for circuitous movement of said post and said seat in response to pushing and pulling by said rider.

3. The exercise seat assembly of claim 2 wherein said trackways are overlapping, each of said followers having a different cross-sectional configuration, each of said trackways having a cross-sectional configuration corresponding to its respective follower.

4. The exercise seat assembly of claim 3 wherein one of said followers is a roller, said roller having an axial portion mounted within a passageway in said post for sliding movement therewithin.

5. The exercise seat assembly of claim 2 wherein said housing has side walls defining an open interior into which said post extends, said trackways being within the interior of said housing.

6. The exercise seat assembly of claim 5 wherein said trackways are channels defined by the side walls of said housing.

7. The exercise seat assembly of claim 2 further including means situated along at least one of said trackways for limiting movement of said post within said housing to a predetermined direction.

8. The exercise seat assembly of claim 2 further including means for securing said post in a fixed position relative to said housing thereby preventing circuitous movement of said post.

9. The exercise seat assembly of claim 2 further including means associated with said seat for securing said seat to said rider.

10. The exercise seat assembly of claim 2 further including spring means for biasing said post to move in a predetermined direction for assisting said rider in circuitously moving said seat.

11. The exercise seat assembly of claim 2 wherein said trackways are vertically disposed to permit upward and downward movement of said post and said seat as well as forward and rearward movement, said trackways having a bottom portion extending rearwardly and downwardly whereby the weight of said rider on said seat moves said seat and said post downwardly and rearwardly.

12. The exercise seat assembly of claim 11 wherein said trackways have a rearward portion extending upwardly and forwardly, and further including spring means for biasing said post for movement upwardly and forwardly for assisting said rider in circuitously moving said seat.

13. The exercise seat assembly of claim 12 wherein said spring means is a constant force spring having one end secured to said post and its other end secured to a forward portion of said housing.

14. The exercise seat assembly of claim 2 having three trackways and three followers arranged nonlinearly on said post to engage said three trackways so as to provide stability of said post during circuitous movement.

15. The exercise seat assembly of claim 2 wherein said followers are balls mounted partially within said post and extending therefrom to engage said trackways, said trackways having an arcuate cross section.

16. The exercise seat assembly of claim 15 wherein said housing has side walls defining an open interior into which said post extends, said trackways being defined by channels formed in said side walls, similar opposing channels being formed in each side wall, each of said balls extending outwardly from the side of said post into engagement with the corresponding trackways in said side walls.

17. The exercise seat assembly of claim 16 wherein said post has a lower portion between said side walls including a central portion and an outer portion on either side of said central portion, said central portion having apertures of a diameter at least as large as the diameter of the balls which are carried therein, said outer portions having apertures smaller than the diameter of said balls whereby said balls are held within said lower portion and extend outwardly therefrom into engagement with said trackways.

18. An exercise seat assembly for use with a supporting frame comprising:
a housing;
means for attaching said housing to said frame;
a seat for a rider;
a seat support post, said seat being attached to said post;
a first guide member on said post remote from said seat;
a second guide member on said post intermediate said seat and said first guide member; and
means associated with said housing for defining a trackway for each of said guide members, each of said trackways having a cross-sectional configuration substantially corresponding to the cross-sectional configuration of its respective guide member, each of said guide members being confined within its respective trackway thereby movably mounting said post to said housing for movement in response to the pushing and pulling by the rider.

* * * * *